No. 874,278. PATENTED DEC. 17, 1907.
J. L. ADAMS.
EGG STEAMER.
APPLICATION FILED JUNE 19, 1907.
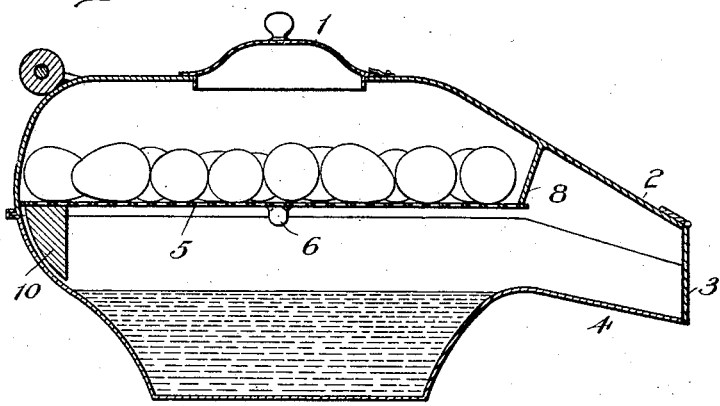
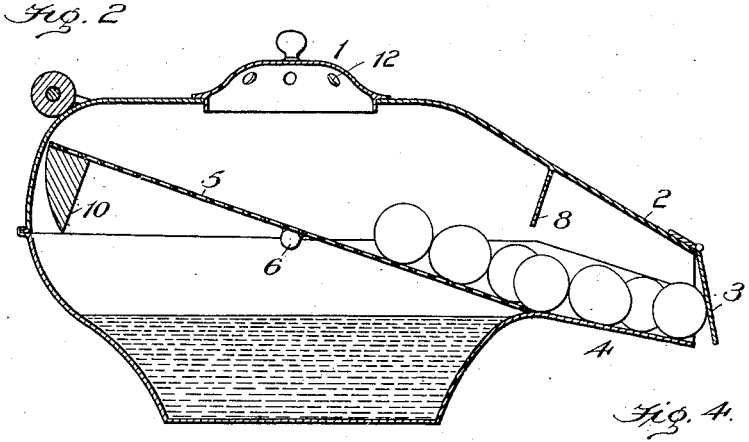
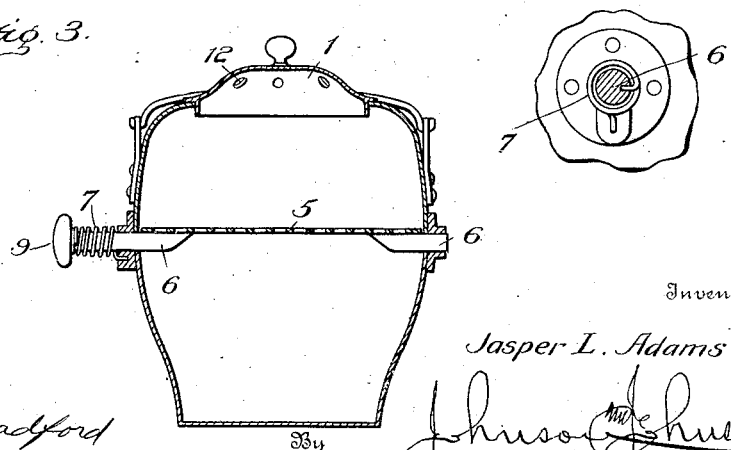
Witnesses
Edwin L. Bradford
Anne B. Johnson
Inventor
Jasper L. Adams
By Johnson & Johnson
Attorneys

UNITED STATES PATENT OFFICE.

JASPER LEE ADAMS, OF ST. GEORGE ISLAND, MARYLAND.

EGG-STEAMER.

No. 874,278.  Specification of Letters Patent.  Patented Dec. 17, 1907.

Application filed June 19, 1907. Serial No. 379,742.

*To all whom it may concern:*

Be it known that I, JASPER LEE ADAMS, a citizen of the United States, residing at St. George Island, in the county of St. Mary and State of Maryland, have invented certain new and useful Improvements in Egg-Steamers; and I do hereby declare the following to be a full, clear, and exact description of the invention, such as will enable others skilled in the art to which it appertains to make and use the same.

The steaming of eggs renders them comparatively dry as distinguished from boiled eggs in which water is forced through the pores of the shell; and my invention consists in the production of a steaming vessel wherein the eggs are steamed upon a perforated pivotally mounted partition or shelf adapted to be tilted to cause the automatic delivery of the steamed eggs at the spout of the vessel, and in the claim appended hereto I will point out the construction wherein my invention resides in connection with the accompanying drawings in which,—

Figure 1 represents a vertical section of a boiler steaming vessel illustrating the manner of supporting the eggs while being steamed. Fig. 2 is an identical view illustrating the manner of causing and delivering the steamed eggs by tilting the partition to produce with the spout a gravity chute. Fig. 3 is a transverse section of the steaming vessel showing the pivotal mounting of the egg supporting perforated partition. Fig. 4 shows in detail the torsional spring connection with the vessel and the pivot of the perforated partition.

The vessel may be of any suitable metal preferably of tin and approximating the form of the tea kettle having a top opening closed by a lid 1, and a spout 2, preferably provided with a gravity closing flap 3, to prevent the escape of the steam and permit the automatic delivery of the steamed eggs through the spout, and for this purpose the bottom 4, of the spout is downwardly inclined to produce with the perforated tilted partition a gravity chute.

The chamber of the vessel is divided by a partition or shelf 5, preferably of perforated tin but may be wire fabric and preferably centrally mounted on pivots 6—6 in bearings in the opposite walls of the vessel so that in its normal horizontal position as a support for the eggs, it will stand above the bottom of the spout in the steam chamber and be caused, when tilted, to form an inclined chute with the bottom of the spout and thereby effect the automatic delivery of the steamed eggs through the spout and for this purpose the lower portion of the vessel forms the boiler and is adapted to be seated in the stove-hole, or supported in any way over a fire. The perforated partition may be centrally or eccentrically mounted and to maintain it in horizontal position when loaded with eggs a torsion spring 7, is coiled upon and connected to one of the pivots and to the wall of the vessel, so that its torsional force will be exerted to hold that part of the partition next to the spout up against a stop 8, depending from the inner wall of the vessel.

The spring should have sufficient force to maintain the partition in a horizontal position against the weight of the eggs on that portion between the pivot mounting and the spout, and for the purpose of tilting the partition to deliver the steamed eggs against the spring force, the pivot has a knob 9, by which the tilting is effected, the bottom of the spout serving as a stop to limit such tilting so that the spout will form an extension of the tilted partition from which the eggs will roll down upon the spout bottom and against its depending flap causing it thereby to open to let the eggs pass out. The steamed eggs having been thus delivered the torsional force of the spring will cause the partition to resume its normal horizontal position.

To render it certain that the pivotally mounted partition will be held in horizontal position under the weight of the eggs being steamed thereon, the torsional force of the spring is supplemented by weighting that portion of the partition at the rear side of the vessel, the weight 10, for that purpose, being directly opposite the spout, so that while the spring and the weight coöperate to hold the partition level under the weight of the eggs, obviously one of these elements may be used without the other. The lid may be held in place against the lifting force of the steam by a button; and the vessel may have a handle by which it may be carried.

A convenient construction for mounting the perforated partition will be to form the vessel in two parts on the line of the mounting pivots and after seating the partition secure the parts by solder to render them steam tight. While I prefer to make the vessel with the top lid obviously the lid may be dispensed with and the spout used to insert the eggs and supply the water.

An important feature of my invention is the arrangement of the stop 8, in the spout so that it will form a fender to prevent the eggs falling into the spout while being steamed, and the tilting of the partition so as to clear the stop and cause the eggs to be automatically delivered through the spout. Obviously the lid may have holes 12 to relieve the undue pressure of the steam and in such case the button for the lid may not be used.

I claim:

1. An egg steamer comprising a vessel having a spout, a perforated partition or shelf pivotally mounted within the vessel dividing it into a boiling and a steaming chamber and as a means for holding the eggs within the steaming chamber for delivery at the spout, means whereby the partition or shelf is maintained in its normal or horizontal position, and means for tilting said partition to deliver the eggs to the spout.

2. An egg steamer comprising a vessel having a spout, a perforated partition or shelf pivotally mounted within the vessel dividing it into a boiling and a steaming chamber and as a means for holding the eggs within the steaming chamber for delivery at the spout, and adapted to be tilted, a stop depending from the inner wall of the vessel to limit the upward tilting of the partition, a torsion spring connected to the outer wall of the vessel and to the pivotal mounting of the partition and adapted to maintain the partition in its horizontal or normal position against said stop, and means whereby the partition is tilted against the tension of the spring to deliver the eggs to the spout.

3. An egg steamer comprising a vessel having a spout, a horizontal perforated partition, or shelf pivotally mounted within the vessel and adapted to be tilted, a weight at the edge of the partition farthest from the spout whereby the partition or shelf is maintained in its normal or horizontal position, and means whereby the partition is tilted to deliver the eggs at the spout.

4. An egg steamer comprising a vessel having a spout, a horizontal perforated partition or shelf pivotally mounted within the vessel and adapted to be tilted, a stop depending from the inner wall of the vessel to limit the upward tilting of the partition, a torsion spring connected to the wall of the vessel and to the pivotal mounting of the partition, and a weight at that edge of the partition or shelf farthest from the spout whereby the partition is maintained in its normal or horizontal position against said stop, and means connected with the pivot of the partition whereby it is tilted to deliver the eggs to the spout.

5. An egg steamer comprising a vessel, a perforated partition pivotally mounted therein for supporting the eggs, means for holding the partition in its normal horizontal position, a spout adapted to deliver the eggs, a stop arranged to hold the eggs on the partition, and means whereby the partition is tilted to clear said stop and automatically deliver the eggs through the spout.

In testimony whereof I have signed my name to this specification in the presence of two subscribing witnesses.

JASPER LEE ADAMS.

Witnesses:
JAS. W. DENT,
BEN GODADOD.